Jan. 17, 1933.　　E. M. HEWLETT ET AL　　1,894,822
SYSTEM OF GUN FIRE CONTROL
Filed Aug. 2, 1923　　10 Sheets-Sheet 1

Inventors:
Edward M. Hewlett,
Waldo W. Willard,
by
Their Attorney.

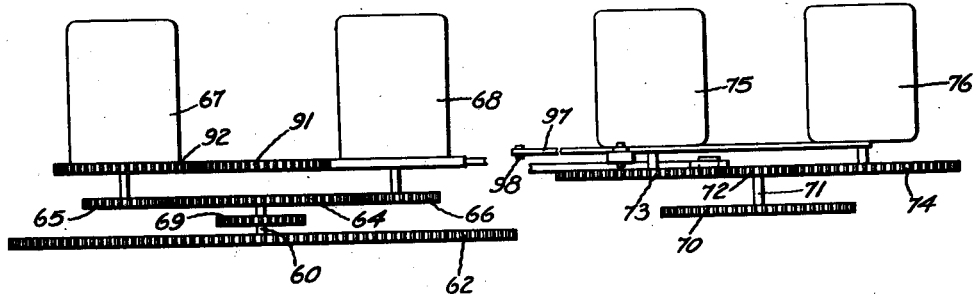
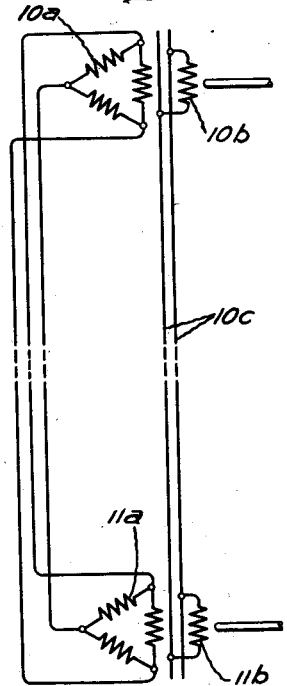

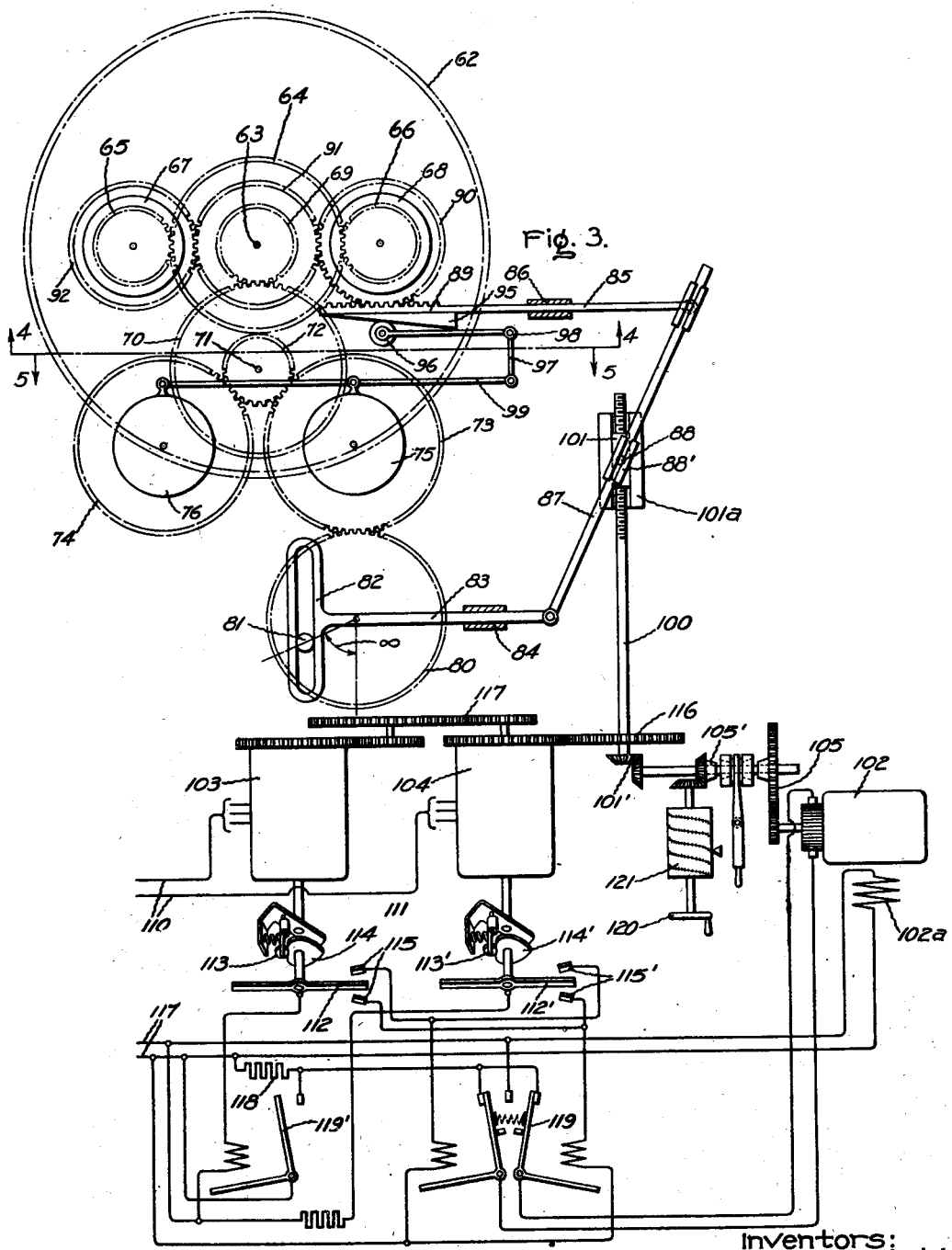

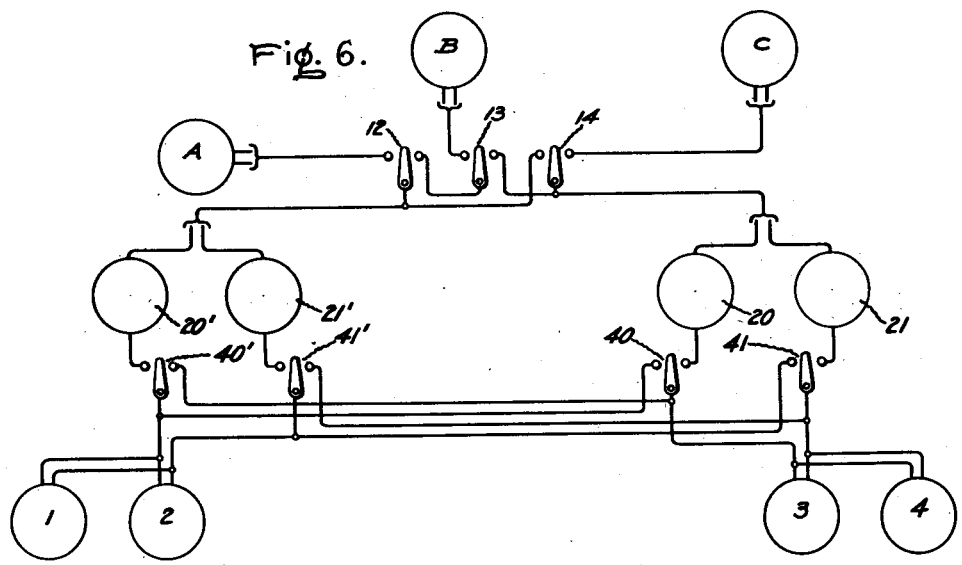
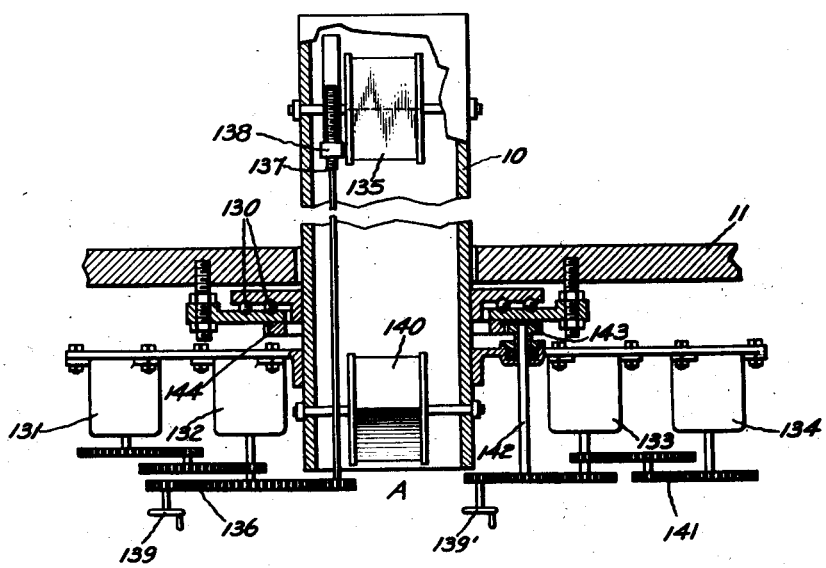
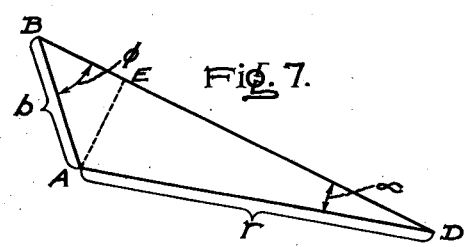

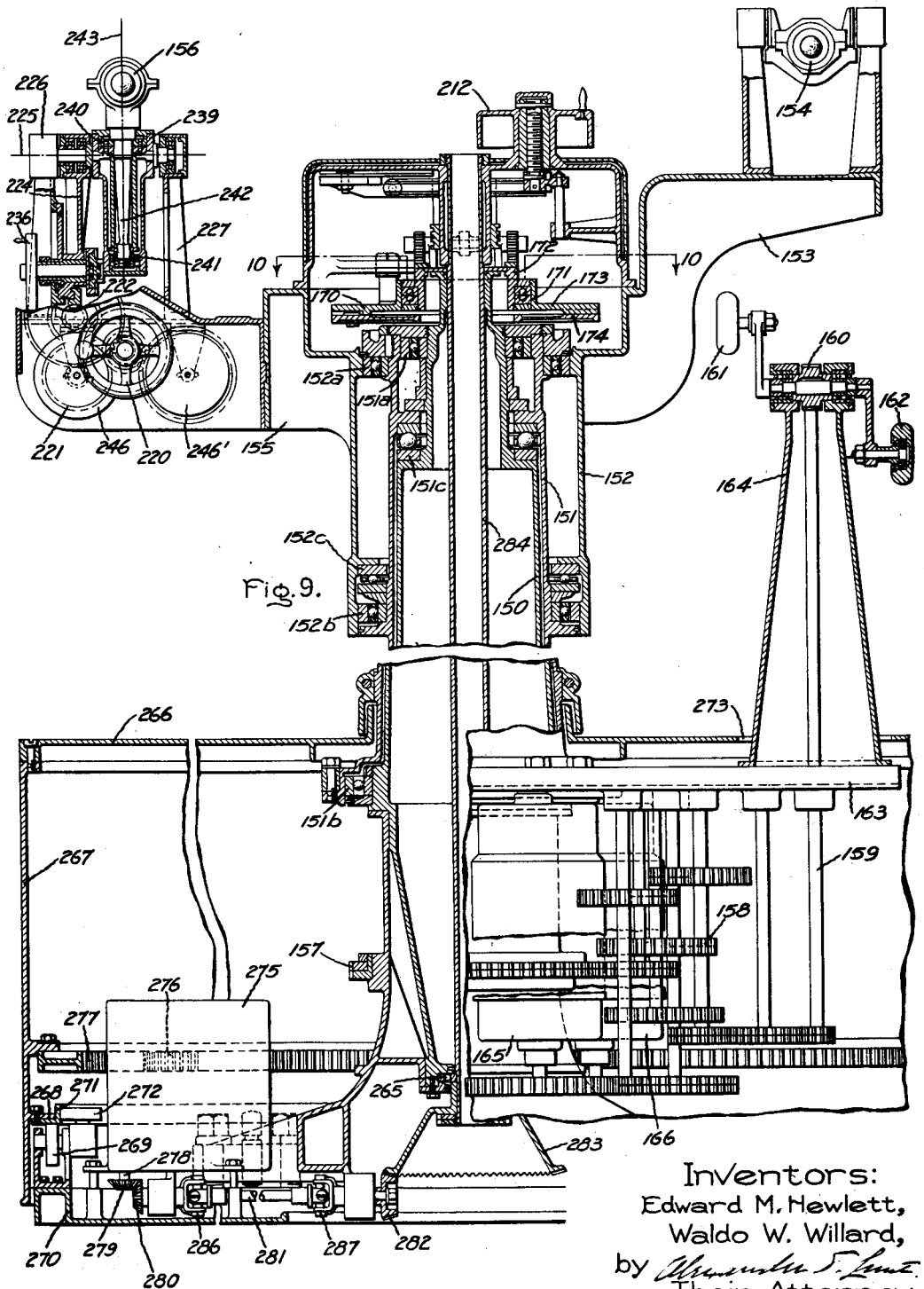

Inventors:
Edward M. Hewlett,
Waldo W. Willard,
by
Their Attorney.

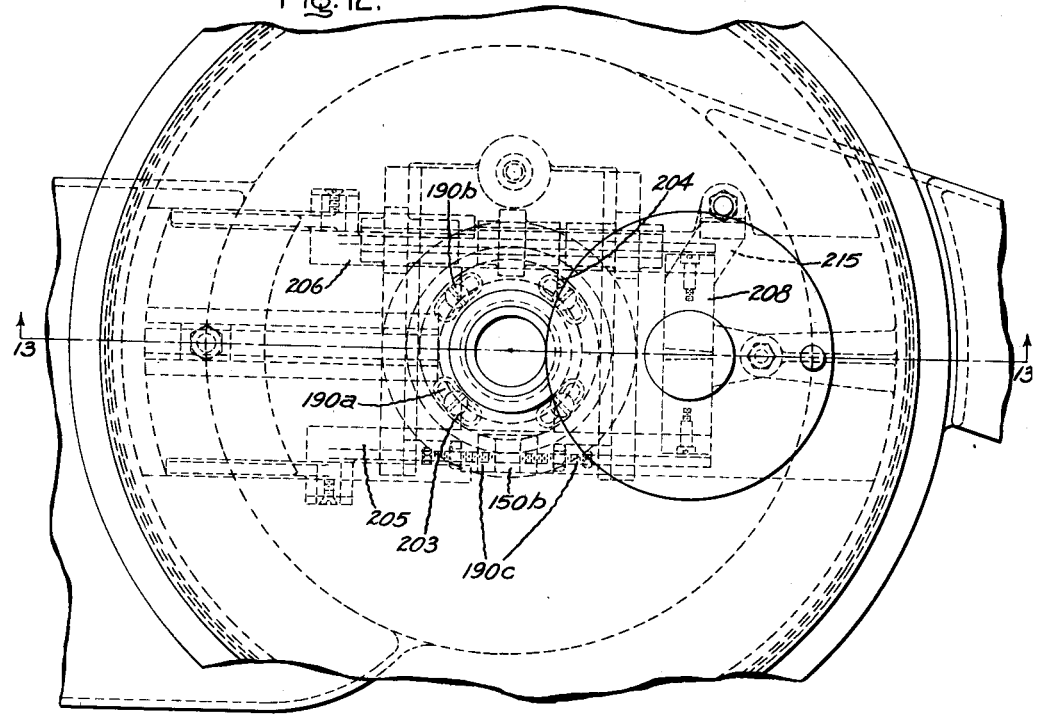
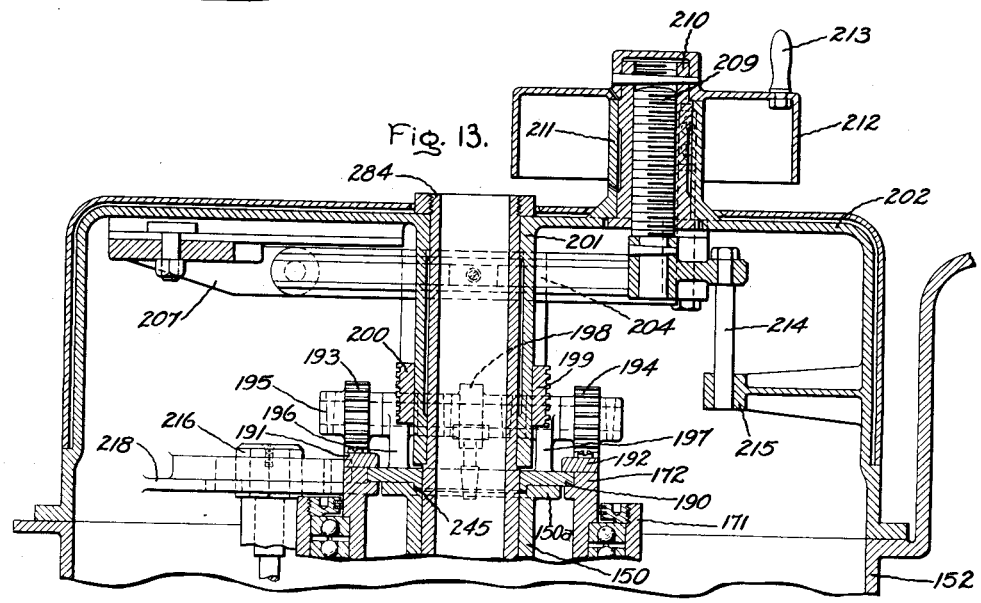

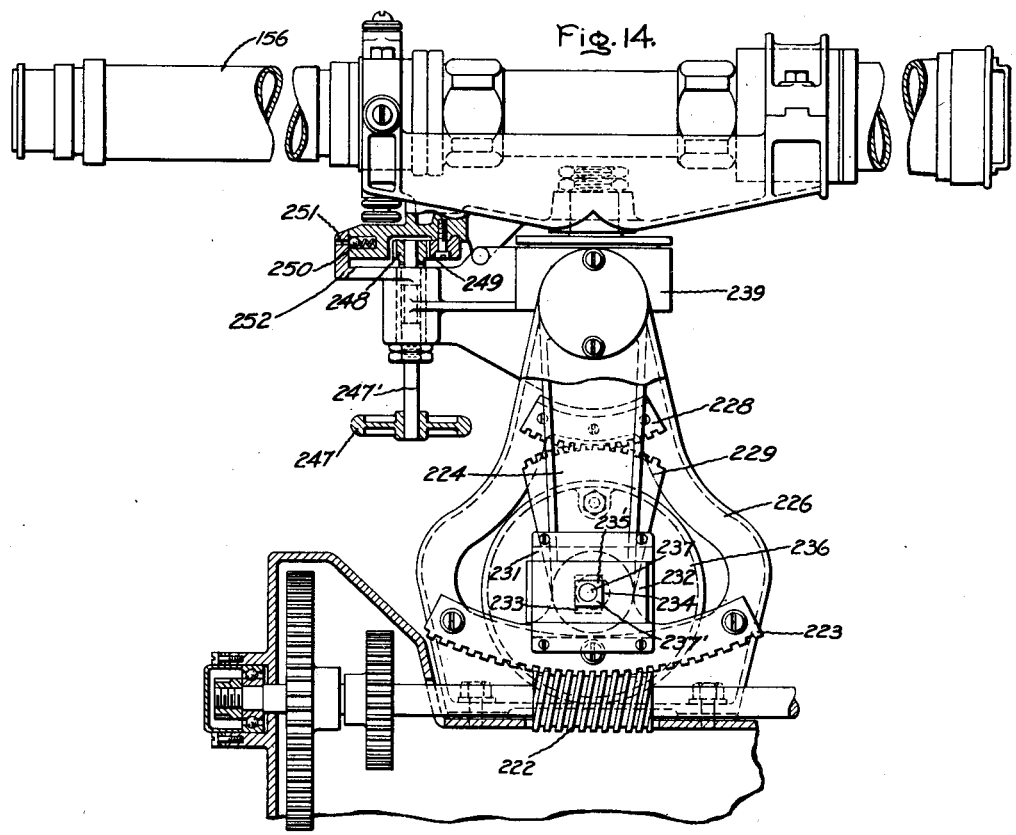
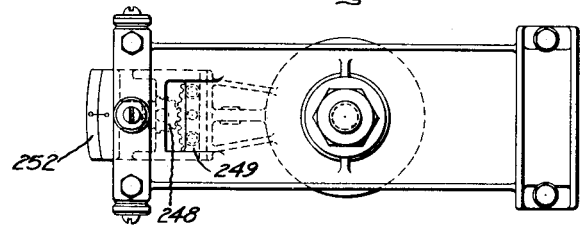

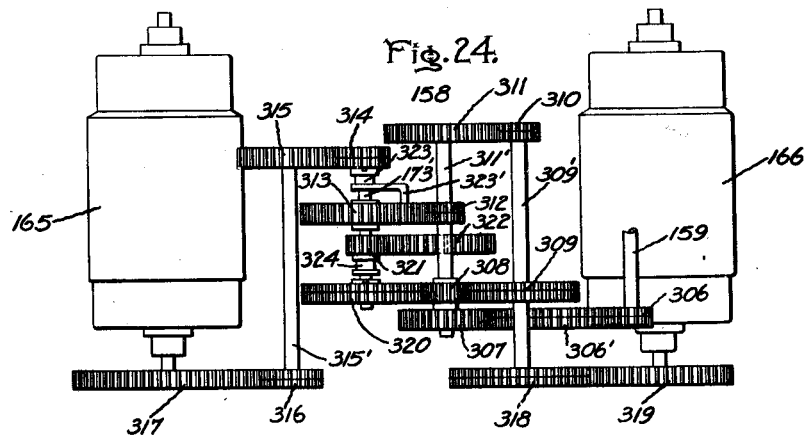
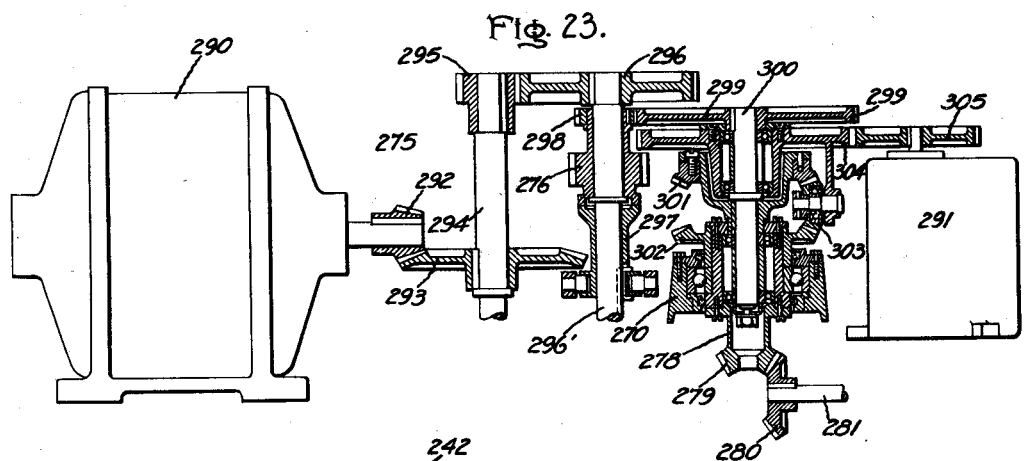
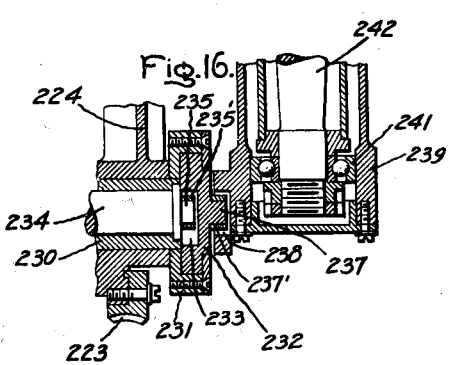

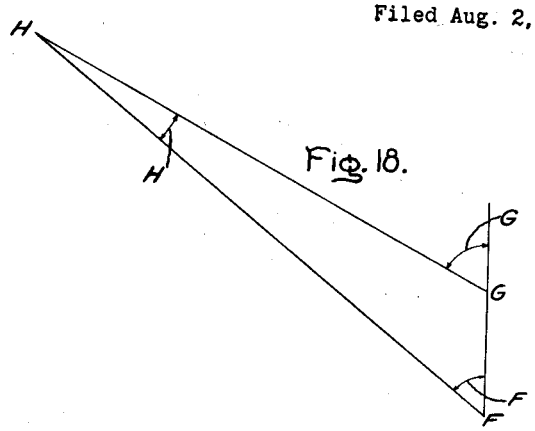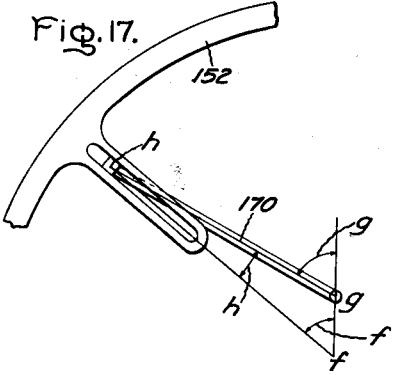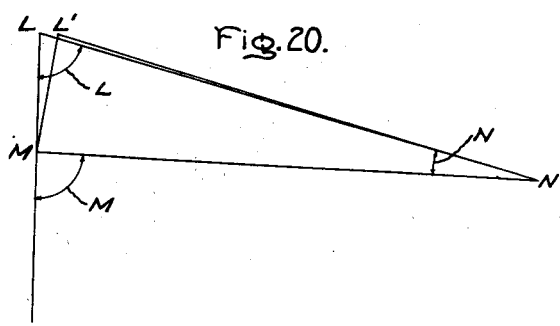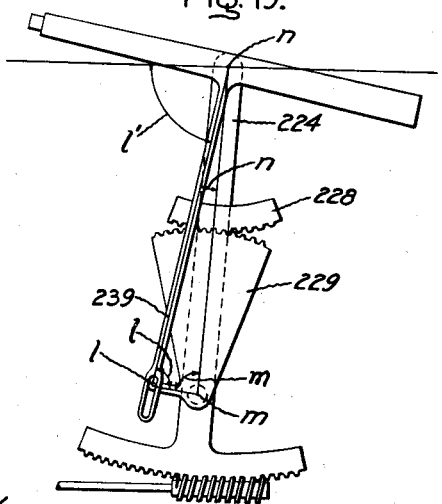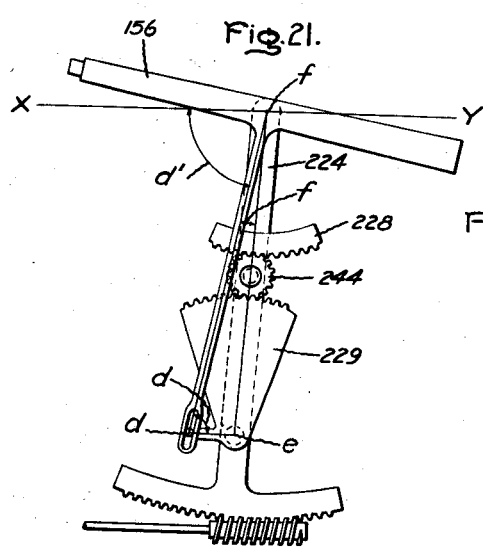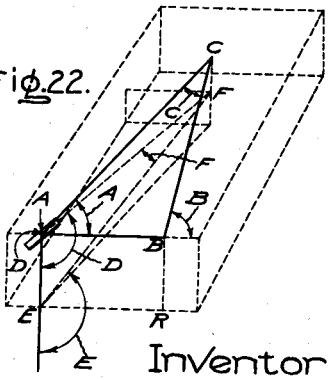

Patented Jan. 17, 1933

1,894,822

UNITED STATES PATENT OFFICE

EDWARD M. HEWLETT AND WALDO W. WILLARD, OF SCHENECTADY, NEW YORK, ASSIGNORS TO GENERAL ELECTRIC COMPANY, A CORPORATION OF NEW YORK

SYSTEM OF GUN FIRE CONTROL

Application filed August 2, 1923. Serial No. 655,358.

Our invention relates to systems of gun fire control and the like, and has for its object the provision of a system of this character giving flexibility of control, as well as apparatus whereby this flexibility of control may be effected.

More specifically our invention relates to the control of guns, searchlights and the like, from a remote telescope or sighting device hereinafter termed a "director". Although our invention is particularly applicable to the control of guns, searchlights, and the like, on board ship, it obviously has application in the control of such devices in general regardless of their location.

In present systems for the control of guns from a remote sighting device or director, a change of the control from one director to another involves the careful synchronizing of the indicating instruments of the system. With such systems a considerable period of time is thus required in shifting the control to another director, during which time the entire ship's battery is obviously out of commission. In case of damage to the director in control therefore, the ship is at the mercy of the enemy until the system has been synchronized with another director. Moreover, with such systems, it is obviously impracticable under battle conditions to shift the control from one director to a plurality of directors for divided fire, or vice versa.

By means of our invention, flexibility is provided so that the control may be instantly transferred as desired from one director to another, or the guns divided into groups under the independent control of a plurality of directors for divided fire on a plurality of targets.

Figure 10:
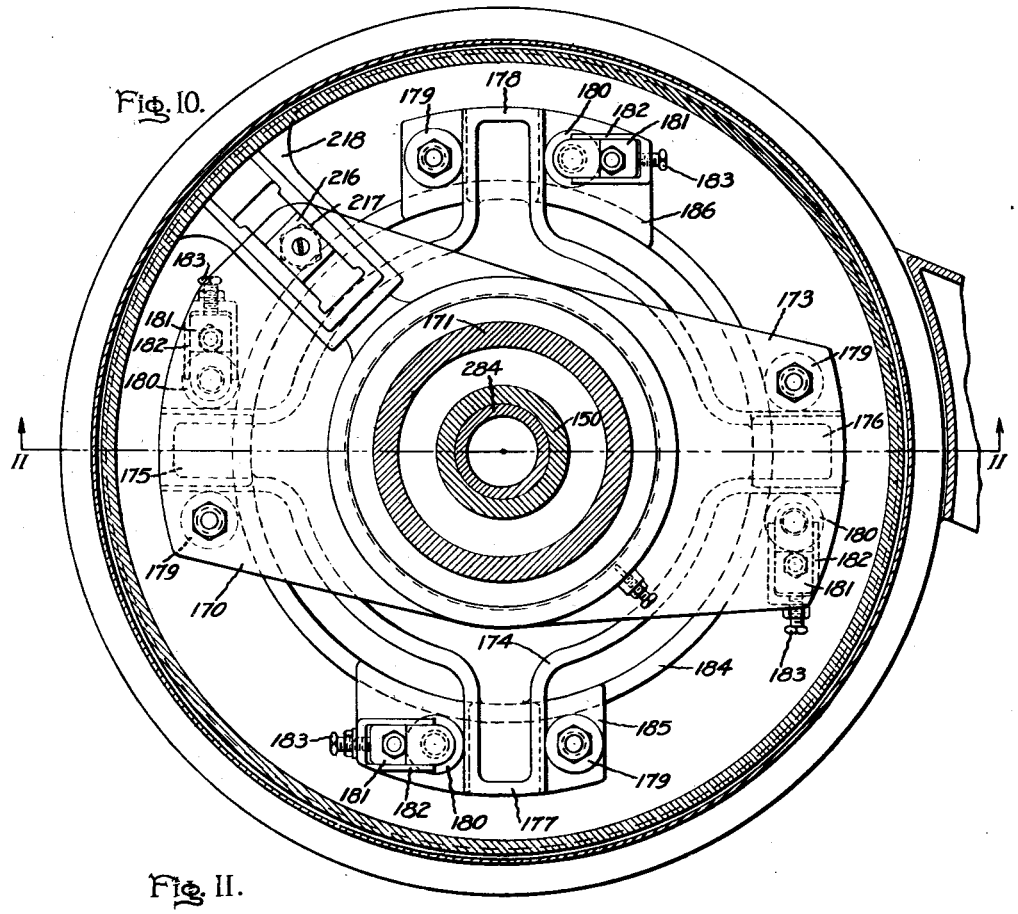
Figure 11:
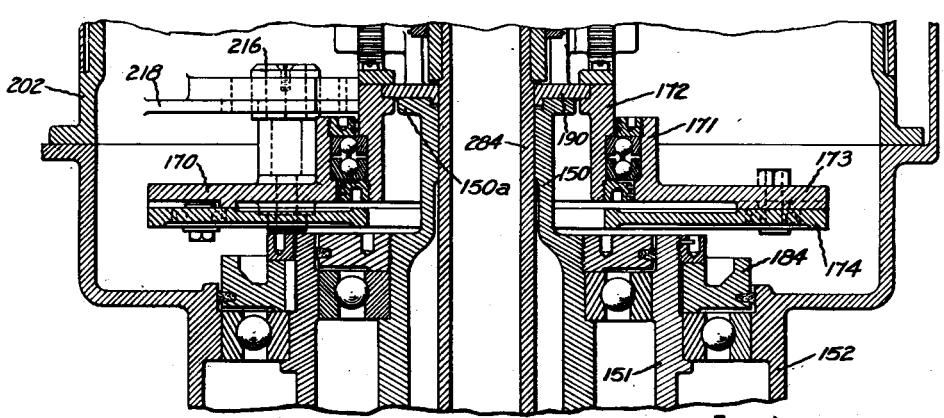

For a more complete understanding of our invention reference should be had to the accompanying drawings in which Fig. 1 is a diagrammatic representation of a system of fire control embodying our invention in which one group only of guns is shown; Fig. 2 is a diagrammatic representation of a preferred system for transmitting angular motion; Fig. 3 is a diagrammatic representation of the parallax mechanism at the gun turrets; Fig. 4 is a sectional view of Fig. 3 looking in the direction of the arrows 4—4; Fig. 5 is a sectional view of Fig. 3 looking in the direction of the arrows 5—5; Fig. 6 is a single line diagrammatic representation of a system of fire control embodying our invention showing a plurality of groups of guns; Fig. 7 is a view showing the triangle solved by the turret parallax mechanism; Fig. 8 is a diagrammatic view partly in section of one of the directors; Fig. 9 is a vertical sectional view of another director; Fig. 10 is a horizontal sectional view along the line 10—10 of Fig. 9 looking in the direction of the arrows; Fig. 11 is a sectional view on the line 11—11 of Fig. 10 looking in the direction of the arrows; Fig. 12 is a fragmentary plan view of Fig. 9; Fig. 13 is a sectional view along the line 13—13 of Fig. 12 looking in the direction of the arrows; Fig. 14 is a fragmentary elevational view partly in section of Fig. 9; Fig. 15 is a fragmentary plan view of Fig. 14 with the telescope removed; Fig. 16 is an enlarged sectional view of part of the vertical parallax mechanism shown in Fig. 9; Fig. 17 is a diagrammatic view of the horizontal parallax mechanism of the director; Fig. 18 is a representation of the triangle solved by the horizontal parallax mechanism; Fig. 19 is a diagrammatic view showing the principles of the vertical parallax mechanism; Fig. 20 is a representation of the triangle solved by the vertical parallax mechanism; Fig. 21 is a diagrammatic view of a modified form of parallax mechanism; Fig. 22 is a perspective view of the triangle solved by the parallax mechanisms; Fig. 23 is a diagrammatic view of the driving mechanism for the operator's platform; while Fig. 24 is a diagrammatic view of a typical train between the transmitting devices.

Referring to Fig. 1 of the drawings, we have shown our invention as applied to the control of guns on war ships, although obviously our invention is not limited to this application. For controlling the guns we have provided in one form of our invention three sighting devices or directors A, B and C. These directors are provided with means for transmitting their respective movements in being brought to bear on the target. The director A is preferably located in the fire control tower and is provided with a periscope 10 which extends upward through the roof armor 11 of the tower so that the observations may be taken from within the tower. The directors B and C are preferably located on the fore top and main top respectively, and are provided with mechanism for transmitting their movements corrected in train for parallax with reference to the director A as a common reference point, and in elevation to the mean height of the gun trunnions. It will thus be observed that the output in both train and elevation of all three directors is the same when directed on a common target, and therefore any one of the directors may be used. The directors A, B and C will be hereinafter described more in detail.

The movements of the directors are transmitted to the guns, where they are reproduced by indicating devices, through suitable coarse and fine electrical systems for the transmission of angular motion. Preferably alternating current systems are used. Briefly such a system may consist of a transmitting device and a receiving or reproducing device of similar construction, being provided respectively with polycircuit armature windings 10a and 11a (Fig. 2) preferably on the stator members of the devices and field windings 10b and 11b, preferably on the rotor members supplied with alternating current from a suitable source 10c. The field windings induce voltages in the circuits of their respective cooperating armature windings the relative magnitude of the voltages depending on the angular relation of the windings. Like points of the armature windings of the two devices are interconnected, and upon angular movement of the rotor of one, the transmitter, an exchange of current is produced between the armature windings whereby a torque is produced causing the rotor of the other, the receiver, to follow the rotor of the transmitter.

The movements of the directors are transmitted in two planes of reference at right angles to each other, a normally vertical plane known as "elevation" and a normally horizontal plane known as "train". By means of appropriate switches 12, 13 and 14, the transmitting devices of any one of the directors A, B and C can be connected to busses 15 and 16, shown in single line diagram, the transmitting devices in train being connected to bus 15 and the transmitting devices in elevation being connected to bus 16. While for the sake of simplicity only one set of switches 12, 13 and 14 are shown, it will be understood that switches will be provided for both train and elevation. In the simplified form shown, each switch comprises a pivoted arm which cooperates with two spaced stationary contacts. It will be observed that by throwing the switch 12 to the left and 14 to the left, director A is connected to the busses; by throwing switch 12 to the right and switches 13 and 14 to the left, director B is connected to the busses; while by throwing switch 14 to the right director C is connected. By means of this arrangement it is impossible to connect more than one director to the busses at one time.

From the busses 15 and 16 the movements in train and elevation are transmitted through devices 20 and 21 by means of which corrections may be introduced. These corrections, for example, may be for windage, drift, etc. in train and for range elevation in elevation. The devices 20 and 21 may be located in any convenient part of the ship, such as the plotting room.

The correcting device 20 comprises a transformer 22 such for example, as described and claimed in our Patent No. 1,612,117 dated December 28, 1926. This transformer comprises two polycircuit armature windings 23 and 24, one of which is rotatably mounted so that it may be adjusted angularly with relation to the other by a handwheel 25 cooperating therewith through worm gearing 25'. When the windings 23 and 24 are angularly displaced it will be observed that the voltages impressed upon winding 23 by the train transmitter to which it is connected are distorted in their transmission by electrical induction to winding 24. This effect is the same as would occur if the train transmitter were rotated in the proper direction. Corrections may therefore be introduced in any desired direction and amount by properly displacing winding 24 by means of handwheel 25. When the two windings are in corresponding angular position, that is, position of no displacement, the voltages impressed on winding 23 are transmitted in their true relation to winding 24, and hence no corrections are introduced.

The correcting device 21 includes a receiving device 26, the stator of which is rotatably mounted and may be adjusted angularly by means of a handwheel 27 through a worm ɛ cooperating with a worm gear 29 secured ʃ a shaft 30 to which also the stator of the receiving device 26 is secured. The rotor member of the receiving device carries a simple indicating dial 32; cooperating with which is a stationary pointer 32'. Operatively connected to shaft 30 through a differential gearing 33 is a transmitting device 34. By means of a handwheel 35 operating through the differential gearing 33 the rotor of generator 34 may be moved independently of shaft 30. In the operation of correcting device 21, handwheel 27 will be turned in accordance with an observed indication on dial 32 whereby the stator of receiving device 26 is turned, carrying with it its rotor, so as to cause the dial to move back towards its zero position. When dial 32 reaches this position, it will be observed that a movement equal to the original movement of the dial has been applied to the generator 34. Corrections are introduced by turning handle 35; whereby the movement applied to the generator 34 may be increased or decreased as desired.

It will be understood that the movements of the directors are transmitted in both train and elevation by two separate systems each operating in two different ratios. Preferably the coarse or slow speed system will operate in a 1:1 ratio with the movement being transmitted while the fine or high speed system will operate in a 72:1 ratio with the movement being transmitted. For the sake of simplicity a single system only in train and a single system only in elevation is shown in Fig. 1. It is contemplated that separate coarse and fine systems will be provided in both train and elevation. This will require coarse and fine sets of correction devices 20 and 21 as well as other corresponding parts of the system.

From the correcting devices 20 and 21 the corrected movements in train and elevation are transmitted through switches 40 and 41 to the gun turrets. Only two gun turrets, the adjacent turrets Nos. 3 and 4, are shown in Fig. 1. By throwing switches 40 and 41 to the right, the train and elevation movements can be transmitted through buses 42 and 43 respectively to both of the turrets.

Since the turrets 3 and 4 are similar in construction and arrangement of the various control equipment, only one will be described, and like reference numerals will be used to designate similar devices in the two turrets. The guns 45 can be adjusted in train by moving the cylindrical turret supporting bodies 46 in train. To provide for this adjustment of the turrets an internal rack 47 is preferably provided on each turret cooperating with which is a driving pinion 48 which is actuated by a suitable driving mechanism (not shown). This driving mechanism may consist of the usual electric motor operating through a Waterbury gear. The guns are adjusted in elevation through suitable means (not shown) and are each provided with a normally vertical internal gear sector 49, having for its center the axis of the gun trunnions.

The coarse and fine movements in elevation of the director in control are transmitted through selsyn transformers 50 and 51 respectively in each turret and thence to a simple indicating device 52. The transformer 50 is connected through a pinion 53 to the gear sector 49 so as to be driven in a 1:1 ratio with the angular movement of the gun in elevation. Transformer 51 is operatively connected through a gear train 54 to transformer 50 so as to be operated in a 72:1 ratio therewith. It will be understood that the indicator 52 consists of a coarse and a fine receiving device carrying indicating dials 55 and 56 on their rotors, which dials cooperate with a stationary pointer 57. Movement of the director in elevation will be shown by the indicator 52, the two dials 55 and 56 moving in their respective coarse and fine ratios. The indicator 52 will, of course, show the movement of the director referred to the common reference plane, the mean height of the gun trunnions. The gun operator will adjust the gun 45 in elevation in such direction as to cause dials 55 and 56 to move back to their zero positions. This is accomplished through the action of transformers 50 and 51. When the dials are on zero, the gun is properly directed in elevation to fire on the target. No parallax compensation in elevation is provided between the turrets and the reference plane for the reason that the difference in height between the turrets and the reference plane is small so that no important error is introduced.

The movements in train of the director in control are transmitted from bus 42 through transformers forming a part of a parallax compensation device 60 to a simple indicator 61 which is similar in construction to indicator 52. Movement in train of the turret is imparted to the parallax compensation device 60 by means of a pinion 62 meshing with the turret rack 47 and operating a drive shaft 63. The adjustment of the gun in train is effected in a manner similar to the adjustment in elevation, the operator watching indicator 61 and adjusting the gun to keep the indicator dials on zero. The function of the parallax device 60 is to introduce a correction in train for parallax between the gun and reference point, director A, which it does by referring the movements of the gun to the reference point.

Referring to Figs. 3, 4 and 5 showing the details of the parallax mechanism 60, the movement of the turret is transmitted from driving shaft 63 through spur gear 64 secured thereto to spur gears 65 and 66 secured to the rotors of a transmitting device 67 and a transformer 68. Shaft 63 also carries a second driving gear 69 which transmits the movement of shaft 63 through a spur gear 70, countershaft 71 and spur gear 72 to the gears 73 and 74 secured to the rotors of a transformer 75 and a transmitting device 76 respectively. The various gear ratios are such that the transmitter 67 and transformer 68 both operate at a ratio of 72:1 with the turret while transformer 75 and transmitter 76 both operate in a 1:1 ratio with the turret.

In order to provide for the introduction of the parallax correction, the stator members of the instruments 67, 68 and 75, 76 are rotatably mounted. Meshing with gear 73 is a similar gear 80 which is provided with a crank pin 81. This crank pin cooperates with a yoke 82 secured to a slide rod 83 moving in a guide 84. Rod 83 is operatively connected to a parallel slide rod 85 moving in a suitable guide 86 by means of a lever 87 provided with an adjustable pivot 88. The pivot 88 is secured to a slider 88' on lever 87 so as to be adjustable thereon. On the left hand end of rod 85 is a suitable gear rack 89 which cooperates with a spur gear 90 secured to the stator of transformer 68. The gear 90 meshes with an idler gear 91 which in turn meshes with a gear 92 similar to gear 90 and secured to the stator of transmitter 67. On the back of rack 89 is an inclined plane 95 sloping downward toward the end of the rack, cooperating with which is a roller 96 carried by a bell crank lever 97 having a fixed pivot 98. The opposite end of the bell crank lever is connected through a link 99 to the stators of transformer 75 and transmitter 76.

As thus constructed and arranged, any movement of the turret 46 causes an equal angular movement of gear 80 since the ratio between them is 1:1, whereby pin 81 causes movement of translation of rod 83 which movement is transmitted through lever 87, rod 85 and rack 89 to the stators of transmitter 67 and transformer 68, and through inclined plane 95, bell crank 97 and link 99 to the stators of transformer 75 and transmitter 76. It will be observed that this movement is proportional to the sine of the angle of movement of the turret.

Referring to Fig. 7, the turret or gun at B, the reference point A and the target D are joined by lines forming the parallax triangle ABD. Drop a perpendicular from point A on line BD intersecting BD at E. Represent the fixed distance AB by $b$, the variable distance or range AD by $r$, the angle ABD by $\phi$, and the parallax angle ABD by $\alpha$.

Then $A E = b \sin \phi = r \sin \alpha$ $$\therefore \sin \alpha = \frac{b \sin \phi}{r}$$

For small angles the sine is equal to the angle $$\therefore \text{for small values, } \alpha = \frac{b}{r} \sin \phi$$

From the above, it will be observed that the parallax angle can be introduced by applying an angular movement to the stators of the instruments equal to $\frac{b}{r}$ times sine $\phi$. Since, as has been observed, a movement proportional to sine $\phi$ is transmitted to the stators through gear 80, then this movement can be made equal to the parallax angle $\alpha$ by adjusting the position of pivot 88 so as to provide a leverage ratio proportioned to $\frac{b}{r}$.

Since $b$ is constant, then the pivot must be adjusted to a suitable function of the range $r$. This is done by means of a shaft 100 having a threaded end which cooperates with a tapped sleeve 101 carrying the pivot 88. The shaft 100 extends at right angles to rods 83 and 85. It is rotated by means of a servo motor 102 operatively connected through bevel gears 101', clutch 105' and spur gears 105. A guide 101a extending at right angles to rods 83 and 85 is provided for the sleeve 101.

The servo motor 102 is controlled automatically in response to movement of two receiving devices 103 and 104 operating at suitable high and low speed ratios with the movements reproduced such as 1:1 and 20:1 respectively. These receivers are controlled by a suitable range transmitting device 106 (Fig. 1) located in the plotting room. This device is operated by turning a knob 106' until the range is indicated by pointer 107 on the range drum indicator 108. The movement thus applied to the range drum 108 is imparted to two transmitting devices (not shown) in the device 106 in the ratios of 20:1 and 1:1 therewith, and is transmitted through switch 109 when thrown to the right, and bus 110 to the receivers 103 and 104 which in turn control the servo motor through suitable control means 111 to cause the servo-motor to reproduce their movement.

As shown, the control means 111 is of the type described and claimed in Patent No. 1,559,525, dated October 27, 1925, to Edwin J. Murphy and Leonard P. Hutt. The receivers 103 and 104 actuate contact arms 112 and 112' respectively, to which they are connected through yieldable couplings comprising spring pressed rollers 113 and 113' secured to the shafts of the receivers and bearing on heart-shaped cams 114 and 114' on shafts common with the respective contact arms. The contact arms have only limited movement between their respective pairs of stationary contacts 115 and 115'. By means of the heart cam connections the contact arms are biased to a predetermined angular relation with the receivers since each spring pressed roller seeks a position in the depression at the base of its heart cam, although the receivers can follow their transmitters instantly moving against the slight bias of the heart cam coupling.

Through the agency of a control relay 119 the application of current to the armature of the servo motor is controlled by the contact arms so as to start and stop the motor in either direction of rotation. The field 102a of the servomotor is permanently connected to a source of direct current supply 117. When the contact arms stand midway between their stationary contacts, as shown in the drawings, the armature of the motor is disconnected from the supply source and short circuited by the relay 119, which when in this position short circuits the armature of the servo motor, providing for dynamic braking of the servo motor and hence quick stopping. Upon the introduction of a range adjustment in the range transmitting device 106, contact arms 112 and 112' are moved by their connected receivers into engagement with one or the other of their stationary contacts, as the case may be, whereby the relay 119 is actuated to cause the motor to operate in the proper direction to apply the desired adjustment of pivot 88. At the same time the stator members of the receivers 103 and 104 are turned in their respective ratios by means of driving gear 116 and gear train 117 in directions opposite to the previous movements of their rotors, the stators carrying the rotors back with them. The servo motor continues to operate until the rotors of the receivers have been turned in this manner back to their original angular position at which time the contact arms will be moved to mid position between their cooperating stationary contacts, whereby the armature circuit of the motor is opened and the motor brought quickly to rest by dynamic braking. A resistance 118 is provided in the armature circuit, which resistance is shunted by a relay 119' when the coarse contact arm 112 is in control whereby the servo motor is operated at a higher speed for the coarse adjustment. The range adjustment is thus applied to the parallax mechanism in the turret by turning the knob 106 in the plotting room. In case of failure of the automatic mechanism between the plotting room and turret, the range may be applied by means of a handwheel 120 after first throwing the clutch 105' to its extreme left position whereby the servo motor 102 is disconnected and the handwheel connected to shaft 100. Handwheel 120 also rotates a range drum scale 121 whereby hand adjustments are facilitated. The position of pivot 88 at all times is such that the parallax correction applied to gear rack 89 is multiplied by 72 for the high speed instruments 67 and 68, this correction being divided by 72 by the inclined plane 95 for the 1:1 speed instruments 75 and 76.

From bus 42 the movements in train are transmitted through the transformers 68 and 75 to the indicating device 61. Upon observing a movement of the director in control on indicator 61, the operator adjusts the turret in train so that this movement as applied corrected for parallax to transformers 68 and 75 causes the dials of the indicator to return to zero, the range adjustment having been applied to the parallax mechanism so that the movements in train of both the gun and the director are referred to the point of reference, director A.

It will thus be observed that the movements in both elevation and train of the director and the gun are compared, the movements to be applied to the gun which are the difference in the movements of the two, or remnant movement to be applied to the gun, being shown on the indicators 52 and 61.

The transmitters 67 and 76 are provided for the purpose of transmitting the movement in train of the gun to a multiple turret indicator 122 located in the plotting room. This multiple turret indicator consists of four simple indicators 122a, 122b, 122c and 122d, each of which is similar to indicator 52. Each simple indicator is connected to a pair of transmitters 67 and 76. For example, indicator 122c is connected to the transmitters in turret No. 4, while indicator 122d is connected to the transmitters in turret No. 3. Since the transmitters 67 and 76 are corrected for parallax to the reference point, the indicators show the exact positions at all times of their respective turrets referred to the point of reference, director A. They are provided for the purpose of checking the positions of the turrets from the plotting room. It will be observed that when the guns are all pointing at the same target the indicators will all read the same.

Geared to each turret rack 47 is a transmitting device 125 which is connected to a double turret indicator 126 in each turret. The double turret indicators are provided with two dials 127 and 128 driven by receiving devices connected respectively to the generators 125 in the two turrets. The gear ratio between generators 125 and turret is preferably 1:1 and, hence, the dials 127 and 128 indicate at all times the positions of the adjacent turrets. Since a high degree of accuracy is not necessary in these instruments, the high 72:1 speed system is not provided. By observing the double turret indicators, the relative positions of the turrets can be observed and interference between the guns prevented. It will be observed that no parallax correction is required, since the actual position of the turrets is to be observed.

Referring to Fig. 6, in the application of our invention, to the usual type of battleship having four turrets Nos. 1 to 4 inclusive, a duplicate set of corrective devices 20' and 21' is provided. With the switching arrangement shown in single line diagram in Fig. 6, a very flexible control is provided. It will be observed that director A transmits to corrective devices 20' and 21' alone when switch 12 is thrown to the left, switches 13 and 14 being open, and to both sets of corrective devices when switches 12 and 14 are thrown to the left, switch 13 being open. In a similar manner director B transmits to corrective devices 20' and 21' alone when switch 12 is thrown to the right and switch 13 to the left, switch 14 being open, and transmits to both sets of corrective devices when switch 12 is thrown to the right and switches 13 and 14 to the left. Director C transmits to corrective devices 20 and 21 alone when switch 14 is thrown to the right, switches 12 and 13 being open, and to both sets of corrective devices when switches 12, 13 and 14 are all thrown to the right. It will thus be observed that directors A and B may each be connected to corrective devices 20′ and 21′ alone, or to both sets of corrective devices, while director C can be connected to corrective devices 20 and 21 alone or to both sets.

The flexibility of the system is facilitated also by the connections provided between the sets of corrective devices and the turrets. By throwing switches 40′ and 41′ to the left, leaving switches 40 and 41 open, the director in control may be connected through corrective devices 20′ and 21′ to turrets 1 and 2 or by throwing all four switches to the left all of the turrets may be connected to the director in control. In like manner, by throwing switches 40 and 41 to the right leaving switches 40′ and 41′ open, the director in control can be connected through corrective devices 20 and 21 to turrets 3 and 4, while by throwing all four switches to the right all four turrets can be connected.

By means of these connections, therefore, directors A and B may each be connected to turrets 1 and 2 only or to all four turrets independently of each other and of director C, while director C may be connected to turrets 3 and 4 only or to all four turrets independently of directors A and B. Thus the guns may all be controlled by any one director for concentrated fire on a single target, while for divided fire turrets 3 and 4 may be operated under the control of director C while at the same time turrets 1 and 2 may be operated under the control of either of directors A and B. It will be observed that it is impossible to connect more than one director to the same pair of turrets at the same time.

Ordinarily for concentrated fire under the control of a single director switches 12, 13 and 14 will be suitably thrown so that only one corrective device will be used although if this set should become inoperative for any reason, it can be disconnected if necessary by appropriate disconnecting switches to permit the switching in of the other set. In case of divided fire, directors A or B will use corrective devices 20′ and 21′ controlling turrets 1 and 2, while director C will use corrective devices 20 and 21, controlling turrets 3 and 4.

By means of the particular system used for transmitting and reproducing the angular motion of the various remote control devices, the various switching operations previously mentioned, whereby the control may be transferred from one director to another as desired, may be effected instantaneously without in any way interrupting the operation of the system. It is an inherent characteristic of this system for transmitting angular motion that the rotor of any receiving device when switched on to a transmitting device will instantly turn to a position of angular agreement with the rotor of the transmitting device, and this is true regardless of the original angular disagreement between them when the receiving device was switched on. Thus the control may be switched from director A pointing at one target to director B pointing at another target remote from the first, in which case the various indicators in the turrets immediately turn to show the position of the new target. By using the high. 72:1 speed system in conjunction with the 1:1 speed system greater accuracy is obtained. The indicating devices driven by the various receiving devices are set when made or installed so as to show in the manner desired the angular positions of the particular object whose movement it is to reproduce. After the system has once been synchronized in this manner no further synchronizing is necessary. This is a great advantage over other systems in which when the control is transferred from one director to another the various indicating devices must be synchronized with that director, with the result that the ship's battery is necessarily inactive for a considerable interval. With such systems the transfer of the control from one director to another during battle conditions is obviously impossible.

It should furthermore be noted that with the electrical motion transmitting system disclosed, if the receiver lags or leads more than 180° with respect to its transmitter the torque of the receiver is reversed and the receiver therefore snaps into angular agreement with its transmitter by moving through the smaller part of the revolution. That is, if the receiver should lag, say 200° with respect to its transmitter, it would turn through an angle of 360° minus 200° or 160° into angular agreement. With the 1:1 speed transmission system this is obviously immaterial. Since the high speed system is driven in a 72:1 ratio so that each revolution represents five degree of gun movement, the high speed receiver in snapping into agreement with its transmitter neglects all multiples of five degrees, i. e., complete revolutions, previously applied to its transmitter. These whole revolutions, however, are taken care of by the initial adjustment under the control of the low speed dial. Furthermore, since the high speed system is driven in a 72:1 ratio its angular range in controlling the gun adjustment is somewhat less than 180° divided by 72, i. e., less than 2½ degrees of gun movement.

In making an adjustment the operator first adjusts the gun in accordance with the low speed dial, provided of course that the angular disagreement is beyond the limits of control of the high speed dial, i. e., 2½ degrees or more of gun movement. His adjustment with the low speed dial will be fairly close perhaps within one degree but under all conditions within 2½ degrees, after which the adjustment is completed in accordance with the high speed dial. Incidentally it will be noted that the high speed differential transformer 51 or 68 in the particular system will have the effect of turning the high speed dial through a complete revolution for each five degrees of gun adjustment.

Referring to Fig. 8, the director A is secured to the roof armor 11 of the fire control tower, the periscope 10 being rotatable about its longitudinal axis on suitable bearings 130. This longitudinal axis of the periscope is normally maintained vertical. Secured to the periscope 10 and carried thereby are two pairs 131, 132 and 133, 134 of coarse and fine transmitting devices of the type shown in Fig. 2. Transmitting devices 131 and 132 are connected in coarse and fine ratios respectively to a reflecting prism 135 at the top of the periscope, and transmit the movements of this prism about a normally horizontal axis. As shown, the devices 131 and 132 may be connected to the prism 135 through a gear train 136 and screw shaft 137 cooperating with a rack 138 which meshes with a pinion secured to the prism. A crank 139 is interposed in the gear train 136 whereby the prism may be tilted so as to reflect the light rays from the target downward to a fixed prism 140 which in turn reflects them to the eye of the observer. This movement is an indication of the position of the target in elevation. The transmitting devices 133, 134 are connected in fine and coarse ratios respectively so as to transmit the movements of the periscope in train, that is, about its vertical axis. This connection may be conveniently made through a gear train 141, countershaft 142 and gear 143, connected to a stationary gear ring 144 concentric with the axis of the periscope. By means of a crank 139', the periscope can be adjusted in train, at the same time applying this movement to the transmitting devices 133 and 134.

The directors B and C are similar in construction and are shown in detail in Figs. 9 to 24 inclusive. Referring to Fig. 9, this director comprises a vertical pedestal or supporting member 150 mounted upon which are concentric rotatable sleeves 151 and 152. The pedestal 150 is adjusted to stand normally in a vertical position so that the sleeves 151 and 152 are caused to rotate about a vertical axis, this axis being the axis of pedestal 150. The sleeve 152 is provided with a bracket 153 carrying a sighting telescope 154 which is freely movable through a limited range in a vertical plane independently of sleeve 152, but is restrained against movement independently of sleeve 152 in a horizontal or level plane, that is, about the axis of pedestal 150.

A second bracket 155 diametrically opposite bracket 153 is also provided on sleeve 152, and mounted on this bracket is a second telescope 156 which has a limited freedom of movement in a horizontal plane, independently of sleeve 152 and is movable in a vertical plane or altitude independently of sleeve 152 by means of mechanism hereinafter described.

Secured to the base of the supporting pedestal 150 is a stationary annular gear 157. Operatively connected to this gear through a suitable gear train 158 is a driving shaft 159 which is actuated through a spiral gearing 160 by hand wheels 161 and 162. The operating mechanism consisting of the hand wheels 161 and 162, shaft 159 and gear train 158 are all mounted on a supporting plate 163 secured to the rotatable sleeve 151 so that upon turning the hand wheels, sleeve 151 together with the operating mechanism is caused to rotate about pedestal 150 in one direction or the other. In this manner, through an operating connection between sleeve 151 and sleeve 152, telescope 154 may be moved in azimuth so as to be brought to bear on the target or point to be observed. Obviously, telescope 156 is at the same time adjusted in azimuth on the target. If necessary telescope 156 may be given a more accurate adjustment in azimuth independently of sleeve 152. The spiral gearing 160 and hand wheels 161 and 162 are mounted in the top of a hollow supporting pedestal 164 secured to plate 163, shaft 159 extending centrally of the pedestal.

Mounted on supporting plate 163 and interposed in gear train 158 so as to be operated respectively at suitable low and high speed ratios with relation to the angular movement of sleeve 151 about pedestal 150, such as 1:1 and 72:1 are two transmitting devices 165 and 166. These transmitting devices are preferably of the type having a single phase field winding cooperating with a polycircuit armature winding. When telescope 154 is moved in azimuth by hand wheels 161 and 162, the transmitting device 165 and 166 are at the same time rotated in their respective ratios and transmit the angular movement imparted to them to the receiving station provided at the gun. The angle transmitted, however, is not the same as the angular movement given the telescope and differs therefrom by the amount of the parallax angle between the telescope 154 or director and the receiving station. This parallax correction is introduced through mechanism to be presently described, forming the operating connection between sleeve 151 and sleeve 152, by means of which a certain angle equal to the parallax angle is either added to or subtracted from the angular movement of the sleeve 151 in imparting the movement of sleeve 151 to sleeve 152.

The operating connection between sleeve 151 and sleeve 152 comprises a table like arm 170 (Figs. 10 and 11) having on one end a collar 171 mounted on suitable ball bearings carried by a bearing ring 172 which is adjustably supported on the upper end of pedestal 150. Extending laterally from collar 171 opposite arm 170 is a table like projection 173. Arm 170 is connected to sleeve 151 so as to be maintained in a predetermined angular relation therewith by means of a coupling cross 174, surrounding pedestal 150, having diametrically extending arms 175 and 176 slidably engaging respectively with the lower faces of arm 170 and projection 173 and diametrically extending arms 177 and 178 at right angles to arms 175 and 176 slidably engaging with the upper end of sleeve 151. The operating connections with the arms of the cross each comprise two spaced rollers 179 and 180, between which the arm moves, one of the rollers 180 of each pair being mounted on a block 181 slidable in a guide 182, so as to be adjustable with relation to the other roller by means of a set screw 183. By adjusting the set screws all lost motion between the rollers of each pair and the cooperating arm can be taken up. To facilitate the operating connections between arms 177 and 178 and sleeve 151, a ring 184 provided with two opposite integral projections or ledges 185 and 186 is secured to the upper end of the sleeve. The ledges 185 and 186 carry the pairs of rollers cooperating with arms 177 and 178.

The bearing ring 172 is slidably supported at its upper end on a rectangular guide member 190 (Figs. 12 and 13), secured to pedestal 150, whereby the ring may be adjusted laterally and thus made eccentric with the vertical axis of pedestal 150. Preferably the upper end of pedestal 150 is provided with a flange 150a and is countersunk at 245 to receive a boss on the guide 190. The guide 190 is provided with a plurality of arc-shaped slots 190a (Fig. 12) through which clamping screws 190b extend into the flange 150a so as to clamp the guide to the pedestal. This arrangement provides for convenience in adjusting the angular relation of the guide and pedestal, and to provide for accuracy of this adjustment, a lug 150b is provided on flange 150a, cooperating on opposite sides of which are set screws 190c carried by guide 190. Secured to ring 172 are two racks 191 and 192 positioned on opposite sides of the guide 190 and extending parallel therewith. Cooperating with the racks 191 and 192 are spur gears 193 and 194 secured to a shaft 195 mounted in bearing posts 196 and 197 secured on guide 190. The spur gears are rotated by a central spur gear 198 secured to shaft 195 which meshes with a circular rack 199 formed on the periphery of a collar 200. As shown, the teeth forming rack 199 extend around the periphery of collar 200 so that the collar may be rotated about the axis of pedestal 150 while being operatively connected to gear 198.

The collar 200 is slidably mounted on a cylindrical guide 201 concentric with the vertical axis of pedestal 150. The guide 201 is integral with a cylindrical cover or casing 202 secured to sleeve 152 and enclosing the upper end thereof.

On opposite sides of the collar 200 are upwardly extending projections 203 and 204 which are pivotally connected to arms 205 and 206. These arms extend approximately at right angles to the axis of pedestal 150 and are pivoted at their left-hand ends to a suitable support 207 carried by the casing 202. The levers are joined at their right-hand ends by being pivotally connected to a cross bar 208 which carries at its center a screw 209. This screw 209 cooperates with a tapped sleeve 210 rotatably mounted but held against longitudinal movement in a cylindrical extension 211 on the casing 202. To the upper end of sleeve 210 is secured an overhanging protecting cover or handwheel 212 provided with a handle 213 by means of which sleeve 210 may be rotated in one direction or the other as desired.

A rod 214, secured centrally to cross bar 208, cooperates with a guide 215 secured to the casing 202 whereby the cross bar is constrained to move in a path parallel with the axis of pedestal 150. The arms 205 and 206 are channel-shaped and serve as guides in which are mounted the operating connections between them and the uprights 203 and 204 and the transverse bar 208. Upon rotation of handwheel 212 therefore screw 209 will be moved in an upward or downward direction as the case may be and this movement transmitted through arms 205 and 206 to the collar 200. The spur gear 198 is thus rotated and its movement transmitted through gears 193 and 194 and racks 191 and 192 to the bearing ring 172. By thus rotating handwheel 212 the eccentricity of the bearing ring with relation to the pedestal 150 may be adjusted as desired and in so doing the position of the pivot point of arm 170 adjusted.

The operating connection between arm 170 and sleeve 152 comprises a rectangular slide 216 (Figs. 10 and 11) secured to the outer end of arm 170 and cooperating with a guide 217 in a radial arm 218 secured to the casing 202.

As thus constructed it will be observed that while the exact movement of sleeve 151 is transmitted to arm 170 through coupling cross 174 this movement is not transmitted to sleeve 152 in case bearing ring 172 is eccentric with the axis of the pedestal because arm 170 and sleeve 152 rotate about different centers. The difference in the two angular movements is the correction for parallax, which is added to or subtracted from the movement of sleeve 151 depending on the angular position of the sleeve on pedestal 150. In case ring 172 is exactly concentric with the axis of pedestal 150, as shown in the drawings, any movement applied to collar 151 is transmitted without change to sleeve 152, and the parallax correction is consequently zero.

The operation of the mechanism will be more easily understood by reference to the diagrammatic representation shown in Fig. 17. Arm 170 is represented as pivoted at a point $g$, located a distance from the axis $f$ of pedestal 150 equal to the eccentricity of collars 171, and also at point $h$ in slider 216. It will be observed that in rotating sleeve 152 through an angle $f$ measured from line $fh$ arm 170 must be rotated through an angle $g$ which is equal to angle $f$ plus angle $h$ of the triangle $fgh$.

Referring to Fig. 18, let the triangle FGH be formed by the projections on the horizontal plane of movement of telescope 154 as a plane of reference of lines joining the director A, the receiving station R, and the target F (Fig. 22). For the purpose of explanation we shall consider the director or telescope 154 as located at F, the receiving station or gun at G, and the target at H. It will be observed that the telescope must be trained through an angle F with relation to the base line FG to be directed on the target, while from the receiving station this angle is G. It will be observed that angle G equals angle F plus angle H. If the triangle $fgh$ (Fig. 17) now be made similar to triangle FGH then angle $h$ will be equal to the parallax angle H and therefore the sum of the angles $f$ and $h$ will be equal to the angle G.

The triangle $fgh$ is made similar to triangle FGH by establishing the relations, angle $f$ equals angle F, and $$\frac{fg}{FG} = \frac{gh}{GH}.$$

Angle $f$ is generated equal to angle F in bringing the telescope 154 to bear on the target, the mechanism having been initially adjusted to establish this relation. This initial adjustment may be conveniently made by arranging the apparatus such that angles $f$ and $g$ will be zero when telescope 154 is pointed at the receiving station G. Since $gh$ and FG are fixed in length, and also of known length, the relation $$\frac{fg}{FG} = \frac{gh}{GH}.$$

may thus be established by adjusting the length of $fg$ inversely in proportion to the known range GH. This adjustment is made in the actual apparatus shown in Figs. 9 to 13 inclusive by moving ring 172 on its guide 190 through the agency of handwheel 212. Under actual battle conditions, the range GH is always greater than the base line FG; therefore triangle $fgh$ is always similar to triangle FGH when the above relations have been established.

It will be observed that as the movement of sleeve 152 is continued in a counterclockwise direction, the parallax angle $h$ will gradually increase to a maximum value, assuming a fixed range, and then gradually decrease until when angle $f$ equals 180°, it will be zero. Should the movement of sleeve 152 be continued in a counterclockwise direction the parallax angle $h$ will increase from zero in the opposite direction so as to be subtracted from the angle $f$ to a maximum value and then decrease to zero upon the completion of a revolution. It will thus be observed that when the target lies on the base line FG extended the parallax correction is zero regardless of the range. Under these conditions guide 217 is in alignment with guide 190.

The telescope 156 is adjusted in a vertical plane so as to be directed on the same target as telescope 154 by means of a handwheel 220 (Fig. 9) which is operatively connected through a suitable gear train 221 to a worm 222 (Fig. 14) cooperating with a worm gear sector 223 operatively connected to the telescope. Interposed in the connection between the gear sector 223 and the telescope is the mechanism for introducing the parallax correction for telescope 156 in its vertical plane of movement. The gear sector 223 is rigidly secured to the lower end of an arm 224 pivoted about the horizontal axis 225 of the telescope 156. The telescope is mounted on suitable pedestals 226 and 227 which are secured to bracket 155. Secured to the pedestal 226 is a fixed gear sector 228 having for its center the axis 225. Cooperating with gear sector 228 is a movable gear sector 229, having a radius equal to that of sector 228 and secured to a sleeve 230 (Figs. 9 and 16) which is rotatably mounted in arm 224 near its lower end. Secured transversely to the right-hand end of sleeve 230 is a rectangular member 231 which forms a support and a guide for a rectangular slider 232. In the left-hand face of slider 232 is a slot 233 extending at right angles to the direction of movement of the slider. A shaft 234 extends through sleeve 230, which forms a bearing for the shaft, and carries on its inner end an eccentric pin 235 provided with a rectangular slider member 235' which is slidably fitted in slot 233. A suitable handwheel 236 (Fig. 9) is provided on the outer end of shaft 234 by means of which the shaft can be rotated. Secured to the right-hand face of slider 232 directly opposite slot 233 is a pin 237 provided with a suitable rectangular slider 237' which is slidably fitted in a slot 238 in a member 239 carrying the telescope. This member 239 is tubular in form and is provided with suitable ball bearings 240 and 241 for the post 242 carrying the telescope. The telescope is thus mounted so as to be rotatable about an axis 243 normal to both the axis 225 and the line of collimation of the telescope. The slot 238 extends in a direction parallel with axis 243.

As thus constructed and arranged it will be observed that by turning handwheel 236, pin 237 can be given any desired amount of eccentricity with relation to the axis of shaft 234 from zero to the total amount of eccentricity of pin 235. Upon movement of telescope 156 about its horizontal axis 225 by means of handwheel 220, it will be observed that gear sector 229, due to its cooperation with gear sector 228, causes rotation of sleeve 230 and hence rotation of the eccentric pin 237 about the axis of sleeve 230. This rotation of pin 237 causes a slight angular adjustment of telescope 156 about its axis 225 for the parallax correction. This adjustment is concurrent with and proportional to the movement being imparted to the telescope by handwheel 220.

In the diagrammatic representation of this mechanism, shown in Fig. 19, let the triangle $lmn$ be formed by lines joining the points of intersection of the axis of pin 237, the axis of sleeve 230, and the axis 225 respectively with a common vertical plane, forming a plane of reference normal to these axes, this plane preferably being the vertical plane in which telescope 156 is being adjusted. It will be evident that in moving the telescope through its angle of elevation $l'$ measured between a horizontal reference line $xy$, and support 239, the arm must be moved through this angle $l'$ plus a small angle $n$. Referring to Fig. 20, let the triangle LMN be formed by lines joining the director, a point M which is the projection of the director on a horizontal plane passing through the receiving station R (Fig. 22), and the target N. For the purpose of explanation we shall consider the receiving station as actually located at M. Obviously, the triangle LMN lies in a vertical plane, which plane is coincident with the plane of triangle $lmn$. Also the line LM is a vetrical base line of fixed and known length. Base line LM corresponds to base line FG of Fig. 18. The above description will be understood by referring to Fig. 22, showing the relation of the triangles ABC and AEF corresponding respectively to the triangles FGH and LMN lying in horizontal and vertical planes respectively for a typical case in which the director is located at A, the receiving station at R and the target at F. It will be observed that the angle of elevation M (angle E of Fig. 22) at the receiving station measured from the vertical base line LM extended is equal to the angle of elevation L (angle D of Fig. 22) at the telescope plus the parallax angle N (angle F of Fig. 22). Therefore, since angle $l'$ (Fig. 19) is generated equal to angle L, if the angle $n$ is made equal to the parallax angle N, then the arm 224 will have generated the angle M, required to direct a gun at M on the target N.

The operation of this parallax mechanism will be more clearly understood by reference to the modified form shown diagrammatically in Fig. 21. In this form of our invention an idler gear 244 is interposed between the gear sectors 228 and 229. This idler gear is mounted on arm 224, and by its use the movement of gear sector 229 is reversed, whereby side $de$ is maintained parallel to reference line $xy$ in all positions of the telescope. Angle $d$ is therefore generated equal to angle L of Fig. 20 and since MN is always greater than LM, by establishing the relation $$\frac{de}{LM}=\frac{ef}{MN}$$

triangle $def$ can be made similar to triangle LMN. But since LM and $ef$ are fixed in value this relation can be established by suitably varying $de$ inversely with MN, the known range of the target from the receiving station N. This adjustment of $de$ is made by turning handwheel 236 so as to adjust the eccentricity of pin 237 equal to the desired length of $de$. Angle $f$ is thus made equal to the parallax angle N, and consequently the angular movement imparted to arm 224 in bringing the telescope on the target is equal to angle N. It will be observed that triangle $def$ is made similiar to triangle LMN by establishing the same relations as are established to make triangle $fgh$ (Fig. 17) similar to triangle FGH (Fig. 18).

In the mechanism shown in Fig. 19, however, $lm$ is parallel with the reference line $xy$ only when arm 224 is normal to the reference line. At other positions of arm 224, triangle $lmn$ is not similar to triangle LMN, for it will be observed that in such positions angle $l$ is not generated equal to angle L. Angle $m$ however is generated equal to angle M, so that triangle $lmn$ will in fact be similar to a triangle L'MN (Fig. 20) in which angle L'MN equals angle M. An error is thus introduced which is zero when arm 224 is at right angles to the reference line and gradually increases from this position, but since the telescope is normally maintained nearly horizontal and consequently arm 224 nearly at right angles to the reference line, this error is too small to appreciably effect the accuracy of the mechanism. For long distance firing it will be observed that the telescope will be pointed practically on the horizon and consequently will lie in a nearly horizontal position.

Interposed in the gear train 221 so as to be operated upon movement of handwheel 220 are two transmitting devices 246 and 246' preferably of the type shown in Fig. 2. These transmitting devices are operated at suitable ratios with the angular movement of arm 224 such as one to one (1:1) and seventy-two to one (72:1) respectively, and thus transmit the movements of arm 224 in their respective ratios.

The telescope 156 can be adjusted in train by means of a handwheel 247 (Fig. 14), secured to support 239, on the vertical driving shaft 247' of which is a spur gear 248 meshing with a horizontal gear sector 249 carried by the telescope. A spring-pressed ball 250 carried by the telescope is adapted to engage with recesses 251 in a cooperating member 252 on support 239 so as to hold the telescope in its adjusted position.

A movable platform 266 for the operators is provided surrounding the base of pedestal 150 (Fig. 9). This platform is in the form of a drum having a cylindrical vertical supporting portion 267 which is provided with a circular internal supporting rail 268 riding on a plurality of stationary rollers 269. The rollers 269 are spaced around the supporting rail and are mounted on a suitable base plate or support 270. A vertical guiding flange 271 is provided on rail 268. Cooperating with the guiding flange are a plurality of spaced vertical rollers 272 whereby the platform is constrained to move on rollers 269 concentrically with the pedestal. An aperture 273 is provided in the platform through which the pedestal 164 projects.

When sleeve 152 is turned by handle 161 and 162, the platform 266 is automatically rotated a like amount in the same direction so that the relative positions of the operators and the telescopes remain unchanged.

The platform is rotated by a servo-motor driving mechanism 275 actuating a driving gear 276 which cooperates with an internal gear 277 secured concentric with pedestal 150 to the supporting portion 267 of the platform. The platform driving mechanism 275 is secured to the base plate 270 and is controlled by a shaft 278 which is operatively connected through mitre gears 279 and 280, shaft 281 and mitre gears 282 and 283 to a vertical tubular driving shaft 284. This shaft 284 extends upwards through the center of pedestal 150 through guide 201 (Fig. 13) and is secured at its upper end to cover 202 so as to be moved with sleeve 152. A ball bearing 265 is provided in pedestal 150 for the lower end of shaft 284. Preferably shaft 281 is provided with two universal joints 286 and 287.

Referring to Fig. 23 the driving mechanism 275 comprises a servo-motor 290 which is automatically controlled by follow-up mechanism operating a suitable drum controller 291. The servo-motor is operatively connected through bevel gears 292 and 293, counter shaft 294, spur gears 295 and 296, shaft 296', and clutch 297 to the platform driving gear 276 and also to a spur gear 298. Meshing with spur gear 298 is a spur gear 299 secured to a shaft 300 which carries a bevel gear 301 forming one of the driving gears of a differential, the opposite driving gear 302 of which is driven by shaft 278. A planetary pinion 303 meshes with gears 301 and 302 and is secured to a spur gear 304 mounted on ball bearings on shaft 300. The spur gear 304 meshes with a driving gear 305 for the controller 291. In the arrangement shown, gears 276 and 298 are secured to a sleeve which is rotatably mounted on shaft 296' and provided on its lower end with projections adapted to mesh with similar projections on clutch 297. Shaft 278 is tubular in form and provided with bearings for shaft 300.

As thus arranged any movement of sleeve 152 is transmitted through planetary gear 303 to the controller 291 whereby the motor 290 is caused to operate and drive the platform in the same direction. The motor at the same time through the follow-up mechanism previously described moves the controller back to "off" position. The platform is thus maintained in a predetermined angular relation with sleeve 152.

Referring to Fig. 24 showing in diagrammatic form the gear train 158, under normal operating conditions the movements of shaft 159 are transmitted through gears 306, 306', 307, 308 and 309, counter shaft 309', gears 310, 311, counter shaft 311', gears 312 and 313, countershaft 173', gears 314 and 315, counter shaft 315', gears 316 and 317 to the transmitting device 165, and from counter shaft 309 through gears 318 and 319, to transmitting device 166. Gears 307 and 308 are secured rigidly together, for example, on a sleeve, and are rotatably mounted on counter shaft 311'. Gear 320 is rotatably mounted on counter shaft 173' and under normal operating conditions is not used. As driving shaft 159 is turned, gear 321 secured to counter shaft 313' rotates turning gear 322 which meshes with the stationary pedestal rack 157 and thus moving the apparatus including sleeve 151 around the pedestal 150. A clutch comprising two slidable sleeves 323 and 324 mounted on shaft 173' is provided. Clutch sleeve 323 is operatively connected to gear 313 by a radial arm 323'. The sleeves are operated together by means of a yoke member, not shown, in a well known manner and are provided with teeth cooperating respectively with similar teeth on gears 314 and 320. With the clutch in the position shown in the drawing, gear 313 is connected to counter shaft 173'. When it is desired to move the telescope 154 rapidly through a considerable angle, for example, in shifting from one target to another, the clutch is preferably thrown to a downward position whereby gear 314 is released and gear 320 connected to counter shaft 173'. The drive from shaft 159 to the turret rack is now through gears 306, 306', 307, 308, 320, 321 and 322 which gives a lower gear ratio between shaft 159 and the pedestal rack whereby telescope 154 may be swung more rapidly around the stationary pedestal. At the same time it will be observed that the operating ratio between the high speed transmitting device 166 and the pedestal rack is changed to a suitable low speed ratio, such as 9:1. The widths of the clutch teeth are designed so that when the clutch is thrown from slewing position back to normal position, the high speed transmitter is connected again in synchronous relation with the telescope 154.

In operating the directors B and C the operator for telescope 154 rotates handles 161 and 162 until the telescope is adjusted in azimuth on the target, while the operator of telescope 156 at the same time turns handwheel 220 until his telescope is adjusted in altitude on the same target, and if necessary adjusts telescope 156 through a small angle in azimuth by turning handwheel 247. At some time, either before or concurrently with the adjustment of the telescope, the range of the target from the receiving station will be set to scale in the two parallax mechanisms by turning the handwheels 212 and 236. This range may be determined in any well known manner, such as by means of a range finder. To facilitate this adjustment the handwheels will preferably be provided with suitable scales cooperating with stationary pointers. It will be understood that the parallax adjustment will be in proportion to the respective distance of each director from the reference point as measured in the horizontal and vertical planes of reference, these being the fixed and known distances FG and LM of Figs. 18 and 20. The operation of the director as thus described causes the transmitting devices 165 and 166 to transmit in their respective ratios the direction of the target in azimuth corrected for parallax with respect to director A as a reference point and transmitting devices 246 and 246' to similarly transmit the direction of the target in altitude corrected for parallax with respect to the reference point. This information is transmitted to the turrets, suitable corrections being introduced by means of correcting devices 20 and 21, where it is utilized in directing the guns, as previously described.

While we have described our invention as embodied in concrete form and as operating in a specific manner in accordance with the provisions of the patent statutes, it should be understood that we do not limit our invention thereto, since various modifications thereof will suggest themselves to those skilled in the art without departing from the spirit of our invention, the scope of which is set forth in the annexed claims.

What we claim as new and desire to secure by Letters Patent of the United States, is:—

1. A system of gun fire control comprising a plurality of directors, a plurality of guns, and means for operating said guns as a single group under the control of one of said directors for concentrated fire or in a plurality of groups under the control of a plurality of said directors for divided fire.

2. A system of gun fire control comprising a plurality of directors, a gun, a relative position indicator at the gun, a driving connection between said gun and said indicator, means for driving said indicator from any one of said directors, means for transferring said indicator from one director to another of said directors and means for automatically synchronizing said indicator with the director when the control is transferred thereto regardless of the angular position of said director.

3. A system of gun fire control comprising a plurality of directing devices, a gun remote therefrom, a position indicator adjacent said gun arranged to be operated by any one of said directors, electrical driving means for said indicator so arranged that when said indicator is transferred from one director to another director pointing at a different target said indicator will automatically synchronize with the new director, and means for transferring said indicator from one director to another.

4. A system of gun fire control comprising a plurality of directing devices, a gun remote therefrom, a position indicator adjacent said gun arranged to be operated by any one of said directors, coarse and fine electrical driving systems for said indicator so arranged that when said indicator is transferred from one director to another director pointing at a different target said indicator will automatically synchronize with the new director, and means for transferring said indicator from one director to another.

5. A system of gun fire control comprising a plurality of directors, a plurality of guns remote therefrom, electrical transmitting devices actuated by said directors, a plurality of indicators adjacent said guns, electrical receiving devices operatively connected to said indicators, electrical connections for said transmitting and receiving devices, and switching means whereby said receiving devices can be connected to any one of said transmitting devices for the control of said guns from a single director or connected in groups to a plurality of said transmitting devices for the control of said guns from a plurality of said directors for divided fire.

6. A system of gun fire control comprising a plurality of directors, a plurality of guns remote therefrom, electrical transmitting devices actuated by said directors, a plurality of indicators adjacent said gun, electrical receiving devices operatively connected to said indicators, polycircuit armature and single phase field windings for said transmitting and receiving devices, electrical connections for the armature windings of said devices, switching means interposed in said connections whereby said receiving devices can be connected at will to any one of said transmitting devices for the control of said guns from a single director or connected in groups to a plurality of said transmitting devices, said transmitting and receiving devices being so arranged that said indicators are turned to synchronism with the director in control regardless of its initial angular position.

7. A system of gun fire control comprising a director, a gun, an indicating member adjacent said gun, an electrical system for the transmission of angular motion connecting said indicating member to said director, and electrical means interposed in said system actuated by movement of said gun for controlling said indicating member jointly with said director so as to cause said indicating member to show the angular relation of said gun and said director.

8. A system of gun fire control comprising a director, a gun, an indicating member adjacent said gun, an electrical system for the transmission of angular motion connecting said indicating member to said director so that said indicator is actuated in response to movement of said director, electrical means interposed in said system for controlling said indicating member independently of said director, and an operating connection between said means and said gun whereby said indicating member is returned to its starting position when said gun is given a movement corresponding to the movement of said director.

9. A directing system comprising a directing object, a directed object remote therefrom, an electrical transmitting device actuated by said directing object, a receiving device, an indicator adjacent said directed object actuated by said receiving device, polycircuit armature and single circuit field windings for said transmitting and receiving devices, electrical connections between the armature windings of said devices, and inductive means interposed in said connections responsive to movement of said directed object, whereby said indicator is controlled jointly by said objects so as to show their angular relation.

10. A directing system comprising a directing object, a transmitting device actuated by said object, single circuit field and polycircuit armature windings for said device, a receiving device similar to said transmitting device, a source of alternating current for the field windings of said device, electrical connections between the armature windings of said device, an indicating device actuated by said receiving device, a directed object, inductively associated polycircuit windings interposed in said connections, one of said windings being movable, and an operating connection between said movable winding and said directed object whereby said indicator is made responsive jointly to the movements of said objects so as to show their angular relation.

11. A system of gun fire control comprising a plurality of directors, a plurality of guns, means associated with said directors for referring their movements to a common point of reference remote from said director and said gun, and means associated with said guns for referring their movements to said common point of reference.

12. A system of gun fire control comprising a plurality of directors remote from each other, a plurality of guns remote from each other and from said directors, and means whereby the movements of said directors and said guns are referred to a common point of reference remote from said director and said gun and compared so that said guns can be directed on a target designated by any one of said directors.

13. A system of gun fire control comprising a plurality of directors, a plurality of guns remote from each other and from said directors, means associated with said directors for referring their movements to a common point of reference remote from said directors and said guns, means whereby the referred movements of any one of said directors may be transmitted to said guns, means associated with said guns for referring their movements to said point of reference, and means for directing said guns on a target designated by one of said directors including means differentially responsive to said referred movements.

14. A system of gun fire control comprising a plurality of sighting devices remote from each other, means associated with said sighting devices for transmitting the movements of said sighting devices referred to a common point of reference, a plurality of directed guns, means for referring the movements of said guns to said point of reference, said point of reference being remote from said directors and said guns, and means for directing said guns on a target designated by any one of said sighting devices including means differentially responsive to said referred movements.

15. A system of gun fire control comprising a plurality of directing devices, a gun remote therefrom, a position indicator adjacent said gun, electrical means for driving said indicator in accordance with the movement of any one of said directing devices referred to a common point of reference, said driving means being so arranged that when said indicator is transferred from one directing device to another directing device pointing at a different target said indicator will automatically synchronize with the new directing device, and means for transferring said indicator from one directing device to another.

16. A system of gun fire control comprising a plurality of directors, a plurality of guns, indicating means at said guns responsive to the movements of any one of said directors referred to a common point of reference remote from said directors and said guns, and means for driving said indicating means in accordance with the movements of said guns referred to said point of reference, whereby the movements of said directors and guns referred to said reference point may be compared so as to direct said guns on a target designated by any one of said directors.

17. A system of gun fire control comprising a director, means for referring the movements of said director to a given point of reference remote from said director, a gun remote from said directors and from said point of reference, means for referring the movements of said gun to said point of reference, and an indicating device differentially responsive to said referred movements so that when said gun is moved in accordance with the movement of said director said indicating device is returned to its starting position.

18. A system of gunfire control comprising a director, a gun remote from said director, an indicator adjacent said gun, an electrical system for the transmission of angular motion operatively connecting said indicator with said director, corrective means driven by said director for correcting the movements of said director as applied to said transmission system for parallax to a predetermined point of reference remote from said director and said gun, means for controlling said indicator independently of said director and an operating connection between said indicator control means and said gun including means driven by said gun for correcting the movements of said gun for parallax to said point of reference whereby said indicator is responsive to the movements of said director and said gun corrected to said point of reference.

19. A system of gunfire control comprising a plurality of directors, a plurality of guns remote from said directors, an indicator adjacent each of said guns, driving means between each of said indicators and its respective gun including means for correcting the movements of said gun as applied to said indicator for parallax to a predetermined point of reference, means for driving said indicators from any one of said directors including means for correcting the movements of said directors as applied to said indicators for parallax to said point of reference, and means for transferring said indicators from one director to another.

20. A system of gunfire control comprising a plurality of directors, a plurality of guns remote from said directors, a position indicator adjacent each of said guns, electrical systems for the transmission of angular motion operatively connecting said indicators to a predetermined one of said directors, electrical control means interposed in said systems for controlling said indicators independently of said director, operating connections between said control means and said guns whereby each of said indicators is differentially affected with the movements of its respective gun and said director so as to show the angular relation thereof, means driven by each of said guns and each of said directors for correcting the movement of the respective director and gun as applied to said indicators for parallax to a predetermined point of reference remote from said directors and said guns and means for transferring said indicators from one director to another.

21. A director comprising a plurality of sighting devices independently movable respectively in predetermined non-parallel planes of reference, motion transmitting means responsive to movements of said sighting devices in said planes of reference, and a common support for said sighting devices movable in one of said planes of reference.

22. A director comprising two sighting devices independently movable respectively in planes of reference at right angles to each other, motion transmitting means responsive to the movements of said sighting devices in said planes of reference, and a common support for said sighting devices movable in one of said planes of reference.

23. A director comprising a plurality of sighting devices, a common support for said sighting devices, means mounting said sighting devices on said support for movement independently of each other in predetermined non-parallel planes of reference, motion transmitting means for each of said sighting devices and a driving connection between each of said sighting devices and its respective motion transmitting means in the plane of reference of said sighting device including means for correcting the movements of said sighting device in said plane of reference as applied to said transmitting means for parallax to a predetermined reference point remote from said director.

24. A director comprising a plurality of sighting devices, a common support for said sighting devices, means movably mounting said sighting devices on said support for movement in azimuth and altitude respectively, means for automatically correcting the movements of said sighting devices in azimuth and altitude, respectively, while being directed on a common objective for parallax between the director and a remote reference point, and means for transmitting said corrected movements.

25. A director comprising two sighting devices, a common support for said sighting devices rotatable in a given plane of reference, means for correcting the movements of said support for parallax between the director and a reference point, means for correcting the movements of one of said sighting devices in a plane at right angles to said plane of reference for parallax between the director and said reference point, and a rigid connection in said plane of reference between the other sighting device and said support, and means for transmitting said corrected movements.

26. In a director, a sighting device carried thereby, a platform independently movable about an axis of rotation of said sighting device, driving means for said platform, and means for controlling said driving means in response to movement of said sighting device so as to maintain said platform in a predetermined angular relation with said sighting device.

27. In a director, a sighting device carried thereby, a platform independently movable about an axis of rotation of said sighting device, an electric driving motor for said platform, and a follow-up control for said driving motor responsive to movement of said sighting device whereby said platform is maintained in a predetermined angular relation with said sighting device.

28. A directing system comprising in combination with an object adapted to be directed on a remote target, a member operatively connected to said object to be given movement of translation, a motion transmitting device operatively connected to said object, a lever arm connecting said member with said transmitting device, and means for adjusting the pivot of said lever arm in accordance with the distance of the target.

29. A directing system comprising in combination with an object to be directed on a remote target, motion transmitting means comprising two relatively rotatable members, means for driving one of said members in a given ratio with said object, and means for driving the other member by said object in a ratio dependent on the parallax angle between said object and a given point of reference.

30. A directing system comprising in combination with an object to be directed on a remote target, motion transmitting means comprising two relatively rotatable members, means for driving one of said members in a given ratio with said object, a member driven by said object in accordance with the sine of the angle of movement of the object, and an operating connection between said member and the other member of said transmitting means comprising means for introducing a correction dependent on the distance of the target.

31. A directing system comprising in combination with an object to be directed on a remote target, motion transmitting means comprising two relatively rotatable members, means for driving one of said members in a given ratio with said object, and means for driving the other member by said object in a ratio dependent on the sine of the angle of movement of the object, the distance of the target, and the distance of the object from a given point of reference, whereby said transmitting means is caused to transmit the movements of said object corrected for parallax to said point of reference.

32. A directing system comprising in combination with an object to be directed on a remote target, motion transmitting means comprising two relatively rotatable members, means for driving one of said members in a given ratio with said object, a member driven by said object in accordance with the sine of the angle of movement of the object, a lever arm forming an operating connection between said member and the other member of said transmitting means, and means for adjusting the pivot of said lever arm in accordance with the distance of said target.

33. A directing system comprising in combination with an object to be directed on a remote target, motion transmitting means comprising two relatively rotatable members, means for driving one of said members in a given ratio with said object, a member operatively connected to said object so as to be given movement of translation in accordance with the angular movement of said object, a lever arm connecting said member with the other member of said transmitting means, and means for adjusting the pivot of said lever arm in accordance with the distance of the target.

34. A system of gun fire control comprising a plurality of guns, motion transmitting means driven by said guns, means for correcting each transmitting means for parallax between its gun and a common point of reference, reproducers driven by said transmitters, and indicators driven by said reproducers, whereby when said guns are directed on a common target said indicators give like readings.

35. A system of gun fire control comprising a plurality of guns, means for transmitting to a distance the angular movements of said guns in a given plane of reference referred to a common point of reference, and indicating devices operated by said transmitting means to show the position of said guns referred to said point of reference, whereby when said guns are directed on a common target said indicators give like readings.

36. In a gun fire control system, the combination with a gun and a sight, of a device for showing the relative train of the gun and sight comprising coarse and fine rotatable indicators, a plurality of repeater motors each connected to an indicator at a one-to-one ratio, and means for actuating said motors including a plurality of transmitters, some of which are connected to the said sight at a one-to-one and at a multiple speed ratio and the others of which are connected to said gun at a one-to-one and at a multiple speed ratio.

37. A system of control comprising a plurality of movable directing devices, a directed object, control means for adjusting said object in accordance with the movements of a selected one of said directing devices, selective means for transferring said control means from one directing device to another and means for automatically synchronizing said control means with the new directing device regardless of its position when the control is transferred.

38. A system of gun fire control comprising a plurality of directors, control means for adjusting said gun in accordance with the angular movements of a selected one of said directors, selective means for transferring said control means from one director to another and means for automatically synchronizing said control means with the new director regardless of its angular position when the control is transferred.

39. A system of gun fire control comprising a plurality of remotely separated directors, means driven by each of said directors for correcting the angular movements of said directors in following a target for parallax to a common reference point, gun control means responsive to the corrected movements of said directors, selective means for transferring said control means from one director to another and means for automatically synchronizing said control means with said director regardless of its angular position when said control means is transferred.

40. A system of gun fire control comprising a plurality of remotely separated directors for following a target, motion transmitting means actuated by each of said directors for transmitting the respective movements of said directors, means operated by said directors for correcting said transmitted movements for parallax to a common reference point, gun control means actuated by said transmitting means, switching means for transferring said control means from one director to another, and means for automatically synchronizing said control means with the director regardless of the angular position of the director.

41. A system of control comprising a plurality of movable directing devices, a plurality of movably mounted directed objects, control means for adjusting each of said directed objects in accordance with the movements of any one of said directing devices and selective means for connecting said control means to any one of said directing devices or for connecting said control means respectively to a plurality of said directing devices for independent operation under the control of a plurality of said directing devices.

42. A system of control comprising a plurality of directing devices mounted for angular movement, a pair of electrical motion transmission devices driven by each of said directing devices in high and low speed ratios, a plurality of movably mounted directed objects, a pair of high and low speed motion receiving devices for each of said directed objects, means including means driven by said receiving devices for adjusting said directed objects in accordance with the angular movements of any one of said directing devices, and selective switching means for connecting said pairs of receiving devices to any one of said pairs of transmitting devices or for connecting said pairs of receiving devices to a plurality of said directing devices for independent operation.

43. A system of gun fire control comprising a plurality of remotely separated directors, a gun, electrical transmitting means driven by each of said directors for transmitting its angular movements in terms of electrical output, means driven by each of said directors for correcting said transmitted outputs for parallax to a common reference point, control means responsive to the outputs of said transmitting means for adjusting said gun in accordance with the angular movements of any one of said directors, selective switching means for transferring said control means from one director to another, and means for automatically synchronizing said control means with the new director regardless of its angular position when the control is transferred.

44. A system of gun fire control comprising a plurality of directors, a plurality of guns, control means for adjusting each of said guns in accordance with the angular movements of any one of said directors, and selective means for connecting said control means to any one of said directors for the control of said guns from a single director or for connecting said control means in groups to a plurality of said directors for the control of said gun from a plurality of said directors for divided fire.

45. A system of gun fire control comprising a plurality of directors, a plurality of guns remote from said directors, control means for adjusting each of said guns in accordance with the angular movement of any one of said directors, selective means for connecting said control means to any one of said directors for the control of said guns from a single director or for connecting said control means in groups to a plurality of said directors for the control of said guns from a plurality of said directors for divided fire, and means for automatically synchronizing said control means with the director in control regardless of the position of said director when the control is transferred.

46. In a system for controlling the position of a movable object, a plurality of angularly movable directing devices, a pair of electrical angular motion transmitting devices driven by each of said directing devices in respectively high and low speed ratios with respect to said directing devices, a high speed electrical receiving device, a low speed electrical receiving device, means including means operated by said receiving devices for adjusting the object in accordance with the movements of any one of said directing devices and selective switching means for connecting said receiving devices to any one of said pairs of transmitting devices.

47. In a system for controlling the position of a movable object, a plurality of angularly movable directing devices, a pair of coarse and fine electrical angular motion transmitting devices driven by each of said directing devices, coarse and fine receiving devices, means including means driven by said receiving devices for adjusting the object in accordance with the movements of any one of said directing devices and selective switching means for connecting said receiving devices to any one of said sets of transmitting devices.

48. In a system for controlling the position of a movable object, a plurality of movably mounted directing devices, a pair of electrical motion transmitting devices driven by each of said directing devices in respectively high and low speed ratios, high and low speed receiving devices, means including means driven by said receiving devices for adjusting the object in accordance with the movements of any one of said directing devices and electrical connections between said receiving devices and said transmitting devices including switching means for connecting said receiving devices to any one of said pairs of transmitting devices.

49. A system of gun fire control comprising a plurality of remotely separated directors, electrical transmitting means driven by each of said directors for transmitting its angular movements in terms of electrical output, means driven by each of said directors for correcting said transmitted outputs for parallax to a common reference point, gun control means responsive to the outputs of said transmitting means, and selective switching means for connecting said control means to any one of said directors or for connecting said control means in groups to a plurality of said directors for divided fire.

50. A system of gun fire control comprising a plurality of directors, a gun, a set of coarse and fine electrical transmitting devices driven by each of said directors, coarse and fine receiving devices adjacent the gun, means including means driven by said receiving devices for adjusting said gun in accordance with the angular movements of any one of said directors and selective switching means for connecting said receiving devices to any one of said sets of transmitting devices.

51. A system of gun fire control comprising a plurality of directors, a plurality of guns, a set of coarse and fine electrical transmitting devices driven by each of said directors, coarse and fine receiving devices adjacent each of said guns, means including means driven by said transmitting devices for adjusting said guns in accordance with the angular movements of any one of said directors and selective switching means for connecting said receiving devices to any one of said sets of transmitting devices or for connecting said receiving devices in groups to a plurality of said sets of transmitting devices for divided fire.

52. A system of gun fire control comprising a plurality of remotely separated directors, a gun, a set of coarse and fine electrical transmitting devices driven by each of said directors, means driven by each of said directors for correcting the movement applied to its transmitting devices for parallax to a common point of reference, coarse and fine receiving devices, means driven by said receiving devices for adjusting the gun in accordance with the angular movements of any one of said directors and selective switching means for connecting said receiving devices to any one of said sets of transmitting devices.

53. A system of gun fire control comprising a plurality of directors, a gun, a set of coarse and fine electrical transmitting devices driven by each of said directors, coarse and fine receiving devices adjacent the gun, coarse and fine indicating devices driven by said receiving devices, selective switching means for connecting said receiving devices to any one of said sets of transmitting devices and coarse and fine means driven by said gun for actuating said indicating devices in accordance with the movements of said gun so that said indicating devices are differentially responsive to the movements of the director and gun.

54. The combination in a gun fire control system of a plurality of directing devices, motion transmitting means driven by said directors for transmitting their angular movements corrected for parallax with reference to a predetermined point of reference, means driven by the gun for generating the movements of the gun corrected for parallax with reference to said point of reference and means differentially responsive to the corrected movements of a selected one of said directing devices and said gun.

55. A system of gun fire control comprising a plurality of directors, a plurality of guns, a set of coarse and fine electrical transmitting devices driven by each of said directors, coarse and fine receiving devices adjacent each of said guns, coarse and fine indicating devices driven by said receiving devices, selective switching means for connecting said receiving devices to any one of said sets of transmitting devices or for connecting said receiving devices in groups to a plurality of said sets of transmitting devices for divided fire, coarse and fine transmitting devices driven by said guns for actuating said indicating devices in accordance with the movements of said guns so that said indicating devices are differentially responsive to the movements of the director and guns and means driven by said directors and said guns for correcting the movements of said directors and said guns as applied to said transmitting devices for parallax to a common reference point.

56. A system of gun fire control comprising a plurality of directors, a gun, electrical transmitting means driven by directors for transmitting the movements of said directors to said gun, means driven by each director for correcting its transmitted movements for parallax to a common reference point, a motion receiving device at the gun, a position indicator driven by said receiving device, means driven by the gun for transmitting the movements of the gun and for applying said movements to said indicator so as to cause said indicator to read zero when the gun is in positional agreement with the director, means driven by said gun for correcting its transmitted movements for parallax to said common point of reference, electrical connections between said transmitting devices and said receiving devices including selective switching means for connecting said receiving device to any one of said transmitting devices.

57. A system of gun fire control comprising a plurality of directors, a gun, a pair of electrical motion transmission devices driven by each of said directors in respectively high and low speed ratio therewith, means driven by each of said directors for correcting the movements of said directors applied to said transmitting devices for parallax to a common point of reference, a pair of receiving devices at the gun, jointly readable indicating members driven by said receiving devices, electrical connections between said receiving devices and said transmitting devices including selective switching means for connecting said receiving devices respectively to any one of said pairs of high and low speed transmitting devices, electrical differential means interposed in said connections having elements movable to control said indicating members independently of said directors, high and low speed driving connections between said differential means and said gun so that movement of said gun returns said indicators to zero, means driven by said gun interposed in said driving connections for correcting the gun movements applied to said different'al means for parallax to said common point of reference.

58. A system of gun fire control comprising in combination with a gun, a sighting device remote therefrom, gun directing device remote therefrom, gun directing means adjacent said gun operated by said sighting device, means remote from said sighting device and said gun for operating said gun directing means independently of said sighting device and said gun and means for adjusting said sighting device independently of said gun directing means.

In witness whereof, we have hereunto set our hands this 1st day of August, 1923.

EDWARD M. HEWLETT.
WALDO W. WILLARD.